US010150269B2

(12) United States Patent
Colby et al.

(10) Patent No.: US 10,150,269 B2
(45) Date of Patent: Dec. 11, 2018

(54) TRANSVERSE GROOVES PROVIDING VENTING IN TREADS FOR RETREADED TIRES

(75) Inventors: E. Bruce Colby, Greenville, SC (US); Dimitri G. Tsihlas, Greer, SC (US); Cesar E. Zarak, Simpsonville, SC (US); Metodi L. Ikonomov, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 559 days.

(21) Appl. No.: 14/367,011

(22) PCT Filed: Dec. 20, 2011

(86) PCT No.: PCT/US2011/066327
§ 371 (c)(1),
(2), (4) Date: Jun. 19, 2014

(87) PCT Pub. No.: WO2013/095406
PCT Pub. Date: Jun. 27, 2013

(65) Prior Publication Data
US 2014/0318678 A1  Oct. 30, 2014

(51) Int. Cl.
*B29C 33/42* (2006.01)
*B29D 30/56* (2006.01)
(Continued)

(52) U.S. Cl.
CPC .............. *B29D 30/52* (2013.01); *B29C 33/42* (2013.01); *B29C 33/424* (2013.01); *B29C 33/76* (2013.01);
(Continued)

(58) Field of Classification Search
CPC ..... B60C 23/19; B60C 11/0323; B60C 11/02; B29D 30/56; B29D 2030/582; B29C 33/42; B29C 33/424
See application file for complete search history.

(56) References Cited

U.S. PATENT DOCUMENTS 2,121,955 A * 6/1938 Eger ................... B60C 11/0306
152/209.18
2,143,528 A * 1/1939 Thomas ................. B60C 23/18
152/153
(Continued)

FOREIGN PATENT DOCUMENTS

FR 2468472 A1 5/1981
GB 746375 A * 3/1956
(Continued)

OTHER PUBLICATIONS

Machine translation for Japan 02-034406 (no date).*
(Continued)

*Primary Examiner* — Steven D Maki
(74) *Attorney, Agent, or Firm* — Hahn Loeser & Parks LLP

(57) ABSTRACT

The present invention includes an improved tire tread having recessed lateral grooves, and a tire having the same. Particular embodiments of the tread include a tread thickness bounded depthwise by a top side configured to engage a ground surface during tire operation and a bottom side configured to attach to a tire carcass, the thickness extending laterally between a first side edge and a second side edge and longitudinally in a lengthwise direction of the tread. The tread further includes a longitudinal groove in fluid communication with the top side or the bottom side of the tread thickness and a lateral groove in fluid communication with the bottom side of the tread thickness extending from the first side edge intersecting the longitudinal groove forming
(Continued)

a vent passageway extending from the longitudinal groove and to the first side edge. The invention includes methods of forming such treads and molds there for.

11 Claims, 7 Drawing Sheets

(51) Int. Cl.
*B60C 11/02* (2006.01)
*B29D 30/52* (2006.01)
*B60C 23/19* (2006.01)
*B60C 11/03* (2006.01)
*B29C 33/76* (2006.01)
*B29D 30/58* (2006.01)

(52) U.S. Cl.
CPC ............. *B29D 30/56* (2013.01); *B60C 11/02* (2013.01); *B60C 11/0323* (2013.01); *B60C 23/19* (2013.01); *B29D 2030/582* (2013.01)

(56) References Cited

U.S. PATENT DOCUMENTS

| | | | |
|---|---|---|---|
| 2,540,043 A | | 1/1951 | Crooker |
| 2,760,541 A | | 8/1956 | Reifenberger |
| 5,603,366 A | | 2/1997 | Nakayma et al. |
| 6,408,910 B1 | | 6/2002 | Lagnier et al. |
| 7,338,269 B2 | | 3/2008 | Delbet et al. |
| 2002/0170641 A1* | 11/2002 | Rayman | ................. B60C 11/02 152/167 |
| 2005/0081972 A1* | 4/2005 | Lopez | ................. B29D 30/0606 152/209.17 |
| 2006/0005905 A1* | 1/2006 | Croissant | ............ B60C 11/0302 152/154.2 |
| 2007/0077320 A1 | 4/2007 | Delbet et al. | |
| 2007/0207323 A1 | 9/2007 | Maxwell et al. | |
| 2008/0006955 A1 | 1/2008 | Niewels | |
| 2008/0047645 A1 | 2/2008 | Gerhardt et al. | |
| 2010/0186858 A1* | 7/2010 | Gallego | ................. B29D 30/56 152/209.1 |
| 2011/0030863 A1 | 2/2011 | Radulescu | |
| 2011/0214789 A1 | 9/2011 | Cress et al. | |

FOREIGN PATENT DOCUMENTS

| | | | |
|---|---|---|---|
| GB | 2061837 A | * | 5/1981 |
| GB | 2061837 A | | 5/1981 |
| JP | 02-034406 A | * | 2/1990 |
| JP | 04-053735 A | * | 2/1992 |
| JP | 04-372406 A | * | 12/1992 |
| JP | 2010-052453 A | * | 3/2010 |
| JP | 2011-245881 A | * | 12/2011 |
| JP | 2011245881 A | | 12/2011 |
| WO | 0000357 A1 | | 1/2000 |
| WO | 2011002445 A1 | | 1/2011 |

OTHER PUBLICATIONS

Machine translation for Japan 2010-052453 (no date).*
Machine translation for Japan 04-372406 (no date).*
Machine translation for Japan 04-053735 (no date).*
Machine translaton for Japan 2011-245881 (no date).*
PCT/US11/66327 International Search Report and Written Opinion, dated Apr. 24, 2012.

* cited by examiner

TRANSVERSE GROOVES PROVIDING VENTING IN TREADS FOR RETREADED TIRES

This application is a National Stage application of International Application No. PCT/US2011/066327, filed Dec. 20, 2011, to which this application claims priority and the benefit of, the disclosure of which is also hereby incorporated by reference.

BACKGROUND OF THE INVENTION

Field of the Invention

This invention relates generally to treads for retreaded tires, and more particularly, to precured treads having transverse grooves to provide venting of gases within the tread.

Description of the Related Art

When retreading tires, it is generally known to replace the tread with a new precured tread. In doing so, a tread is generally formed having grooves arranged along an outer side of the tread. In particular instances, longitudinal grooves may also be arranged along an inner or bottom side of the tread to provide one or more tread wear layers, where different tread features are exposed as the tread wears depthwise into a thickness of the tread.

During the retreading process, a new precured tread is arranged around a pre-existing or used tire carcass, typically with bonding material arranged between the new tread and the tire carcass to promote adhesion between the tread and the tire carcass. The retread tire is bonded together by vulcanizing or curing the tire assembly, thereby causing the bonding material to adhere the new tread to the tire carcass.

The longitudinal voids, if closed to the outer tread surface during the curing operation, can experience an internal pressure different from the pressure applied to the outer tread surface due to the air trapped within the closed longitudinal voids. This pressure differential may increase when vacuum is applied to a curing membrane in which the tire is situated and/or when pressure is applied to the tire by the autoclave. This pressure differential can cause distortion of the tread elements in the cured tire.

Additionally, during use of such prior retreaded tires, air trapped in the hidden grooves on the inner or bottom side of the tread may at various times be at a different pressure from atmospheric, either because of inertia, an increase or decrease in temperature, and/or from deflection of the tread, thereby causing undesirable pressure differentials in the hidden voids under the tread. Any such pressure differential can cause distortion of the tread elements in the cured tire.

Accordingly, there is a need for venting the air contained beneath or within the tread during the retreading process and during tire operation. Further, such venting, if applied in a manner described in certain embodiments of this invention, could result in a cooling effect to significantly lower running temperatures of the tread ribs or elements thereof during tire operation.

SUMMARY OF THE INVENTION

Particular embodiments of the present invention include a tire tread having recessed lateral grooves in fluid communication with one or more longitudinal grooves and a bottom side of the tread. Such tread includes a tread thickness bounded depthwise by a top side configured to engage a ground surface during tire operation and a bottom side configured to attach to a tire carcass. The thickness extends laterally between opposing side edges and longitudinally in a lengthwise direction of the tread. The tread further includes a longitudinal groove in fluid communication with the top side or the bottom side of the tread thickness and a lateral groove in fluid communication with the bottom side of the tread thickness extending from at least one of the side edges and intersecting the longitudinal groove forming a vent passageway extending from the longitudinal groove and at least one of the side edges.

Further embodiments of the present invention include a method of forming a tire tread. Such embodiments include providing a mold comprising at least a first mold portion and a second mold portion cooperatively positionable together to form a cavity there between corresponding to a tire tread. The first mold portion includes a top interior surface corresponding to a top side of a tread thickness configured to engage a ground surface during tire operation. The second mold portion includes a bottom interior surface corresponding to a bottom side of the tread thickness configured to attach to a tire carcass. The mold further includes a first interior side surface and a second interior side surface corresponding to a first side edge of the tread thickness and a second side edge of the tread thickness respectively, each extending longitudinally in a lengthwise direction of the tread. A further step of the method comprises arranging a longitudinal groove core within the mold to project into the cavity, the longitudinal groove core being positioned to form a corresponding longitudinal top groove or longitudinal bottom groove in the tread thickness. A further step includes arranging a lateral groove core in operable connection with the bottom interior surface of the second mold portion, the lateral groove core being arranged to extend from the first interior side surface and engage the longitudinal groove core at least when the first mold portion and the second mold portion are positioned together, the recessed lateral groove core being arranged a distance below the top interior surface of the first mold portion. A further step of the methods includes molding tread material in the mold cavity to form the tread, the tread including a recessed lateral groove formed by the lateral groove core, the recessed lateral groove being in fluid communication with the bottom side of the tread thickness to form a vent passageway in the tread thickness from the longitudinal groove to the first side edge of the tread thickness.

Particular embodiments of the invention comprise a mold for forming a tire tread. Such embodiments include at least a first mold portion and a second mold portion cooperatively positionable together to form a cavity there between corresponding to a tire tread. The first mold portion includes a top interior surface corresponding to a top side of a tread thickness configured to engage a ground surface during tire operation. The second mold portion includes a bottom interior surface corresponding to a bottom side of the tread thickness configured to attach to a tire carcass. The mold further includes a first interior side surface and a second interior side surface corresponding to a first side edge of the tread thickness and a second side edge of the tread thickness respectively, each extending longitudinally in a lengthwise direction of the tread. The mold further includes a longitudinal groove core projecting into the cavity positioned corresponding to a longitudinal top groove or longitudinal bottom groove in the tread thickness and a lateral groove core connected to the bottom interior surface projecting into the cavity and extending from the first interior side surface in contacting engagement with the longitudinal groove core when the first mold portion and the second mold portion are positioned together. The lateral groove core corresponds to a lateral groove in fluid communication with the bottom side of the tread thickness forming a vent passageway in the tread thickness from the longitudinal groove in the tread thickness through the first side edge of the tread thickness.

The foregoing and other objects, features and advantages of the invention will be apparent from the following more detailed descriptions of particular embodiments of the invention, as illustrated in the accompanying drawings wherein like reference numbers represent like parts of the invention.

DETAILED DESCRIPTION OF THE DRAWINGS

Figure 15:
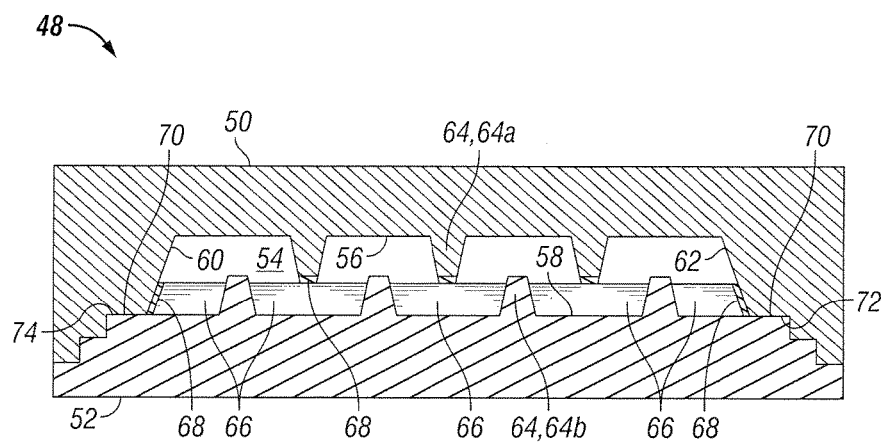

FIG. 15 is a partial cross sectional view of a tread mold in a closed arrangement, whereby compressible pads are arranged between top and bottom mold portions comprising mold portions at engagement locations between the top and bottom mold portions and whereby the mold parting line forming a partition between the top and bottom mold portions is arranged below the top of any lateral groove core of the bottom mold portion in accordance with a particular embodiment of the invention.

Figure 16:
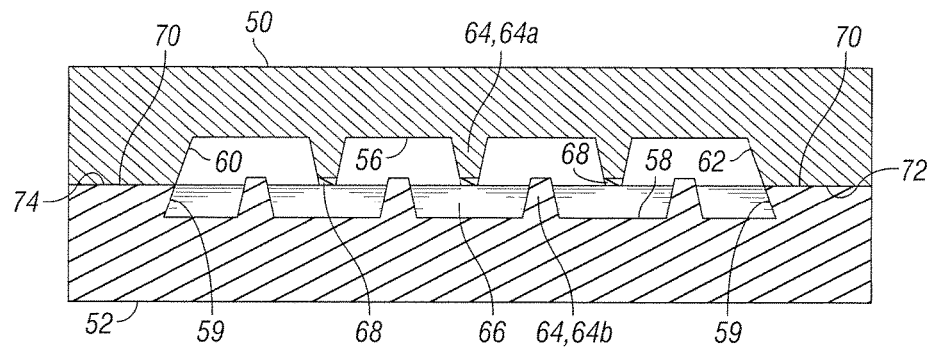

FIG. 16 is a partial cross sectional view of a tread mold in a closed arrangement, whereby compressible pads are arranged between top and bottom mold portions comprising mold portions at engagement locations between the top and bottom mold portions and whereby the mold parting line forming a partition between the top and bottom mold portions is arranged at or above the lateral groove cores of the bottom mold portion in accordance with another embodiment of the invention.

Figure 17:
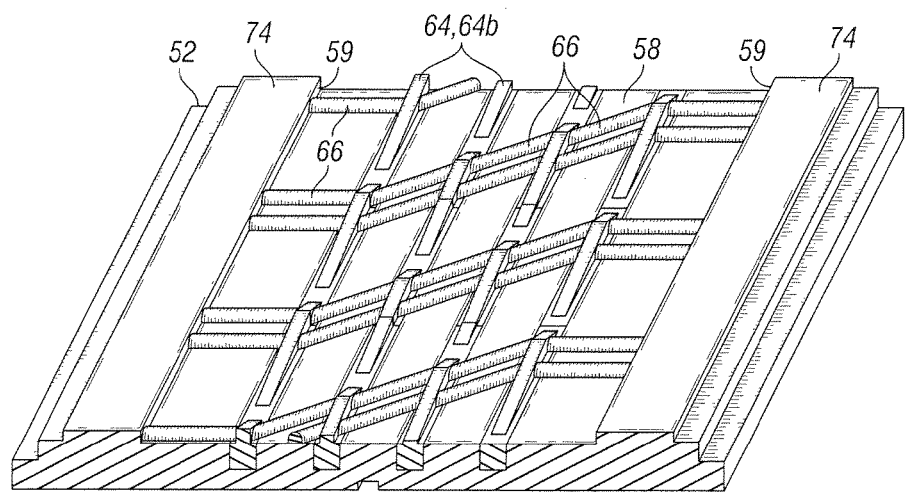

FIG. 17 is a partial perspective view of a bottom mold portion in accordance with a particular embodiment for use in the mold in FIG. 16.

Figure 18:
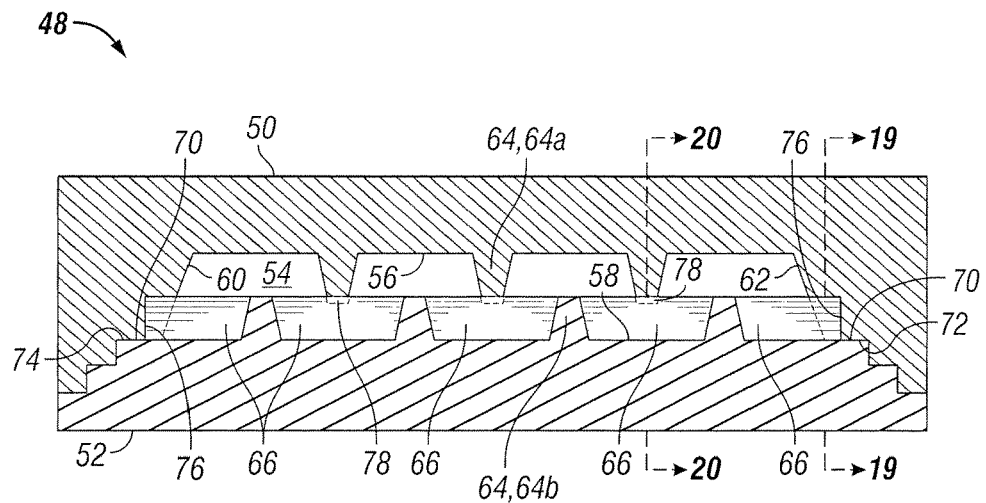

FIG. 18 is a partial cross sectional view of a tread mold in a closed arrangement, whereby the mold parting line forming a partition between top and bottom mold portions comprising top and bottom mold portions remains arranged below the top of any lateral groove core of the bottom mold portion such that the lateral groove core extends into an aperture arranged within a side surface of the top mold portion while also extending through one or more longitudinal groove cores in accordance with another embodiment of the invention.

Figure 19:
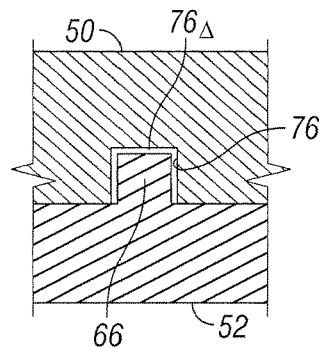

FIG. 19 is a sectional view taken along line 19-19 in FIG. 18 showing the lateral groove core extending into a side of the top mold portion.

Figure 20:
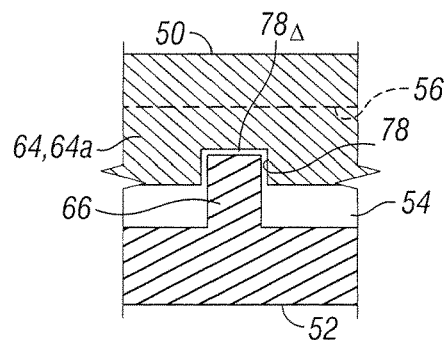

FIG. 20 is a sectional view taken along line 20-20 in FIG. 18 showing the lateral groove core extending into the longitudinal mold core.

DETAILED DESCRIPTION OF PARTICULAR EMBODIMENTS

Particular embodiments of the present invention provide tire treads for use in cold retreading manufacturing of retreaded tires. In cold retreading, a new tread is molded separately prior to installation on the tire carcass, such as in a flat mold, for example. The new tread may be fully or partially cured prior to its application upon a tire carcass to form a pre-cured tread. Subsequently, the pre-cured tread is arranged or placed atop a pre-existing or used tire carcass. The tire carcass may be prepared to receive the new tread by any known means, such as by buffing, grinding, abrading, or cutting the prior tread from the carcass. Prior to applying the tread to the tire carcass, a bonding material may be arranged between the new tread and the tire carcass to promote adhesion and bonding between the tread and the tire carcass. The bonding material may comprise any known material suitable for its intended purpose of bonding the new tread to the tire carcass. For example, the joining material may comprise an adhesive or material curable by way of vulcanization, such as natural or synthetic rubber or any other elastomeric and/or polymeric material, which is commonly referred to as liaison rubber or cushion gum. The retread tire is typically bonded together by vulcanizing or curing the tire assembly causing the joining material to bond the new tread to the tire carcass.

Tire treads are often formed to include a tread pattern along an outer side or face (i.e., a top side or face) of the tread for engagement with a ground surface during tire operation. The tread pattern includes grooves arranged along the top side, where such grooves may comprise longitudinal and/or lateral grooves. Longitudinal grooves form circumferential grooves when the tread is arranged on a tire, and may extend along a linear or nonlinear path along the tire circumference. Grooves arranged in fluid communication with the top side are referred to herein as outer or top grooves or top-side grooves. Treads may further include submerged voids comprising grooves arranged along an inner side (i.e., a bottom side or face) of the tread. Submerged voids or grooves in fluid communication with the bottom side of the tread are referred to herein as inner or bottom grooves or bottom-side grooves, and may also comprise circumferential and/or lateral grooves when the tread is arranged on a tire.

Figure 1:
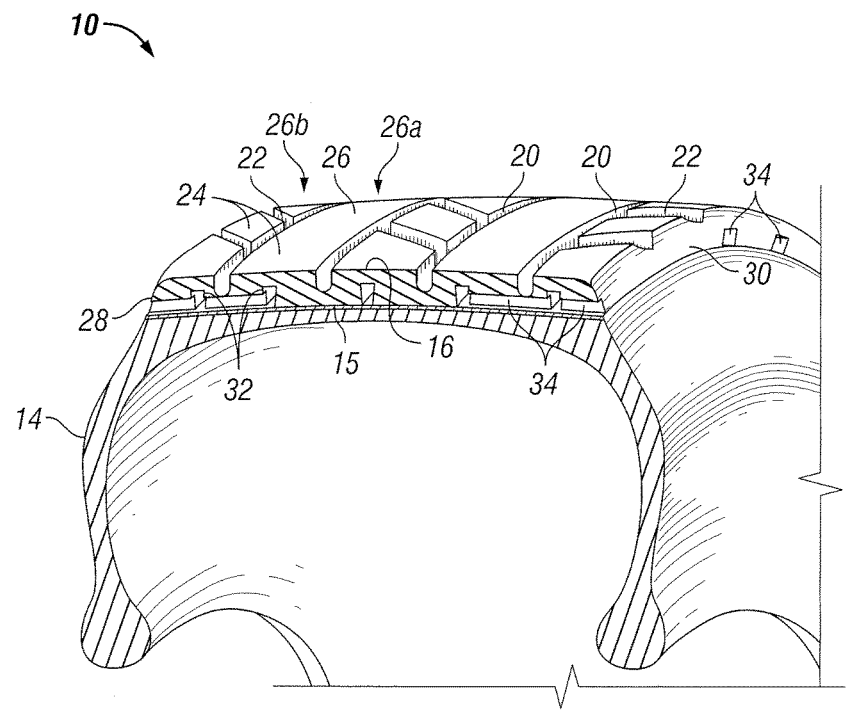
FIG. 1 is a front sectioned partial perspective view of a retreaded tire comprising a tread arranged atop a tire carcass.
Figure 2:
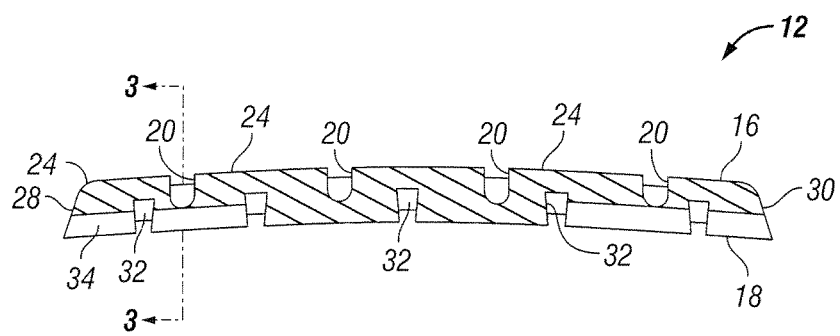
FIG. 2 is a front sectional view of the tread of FIG. 1 for application to a tire carcass to form a retreaded tire.

With reference to FIGS. 1-2, an exemplary retreaded tire is shown. Retreaded tire 10 includes a tread 12 arranged atop a tire carcass 14 with bonding material 15 (forming a bonding layer) arranged there between. The tread 12 includes a top side or face 16 (i.e., an outer side) and a bottom side or face 18 (i.e., an inner side). The tread 12 comprises a tread thickness bounded depthwise by the top side 16 configured to engage the ground surface during tire operation and the bottom side 18 configured to attach to the tire carcass 14. The tread thickness also extends laterally between a first side edge 28 and a second side edge. Typically, the width of the tread thickness along the top side 16 is less than or the same as the width of the tread thickness along the bottom side 18. The tread further includes a tread pattern arranged along the top side 16. The tread pattern includes one or more top longitudinal grooves 20 (i.e., top-side grooves) in fluid communication with the top of the tread. As shown in FIG. 1, the tread 12 may include top longitudinal grooves 20, also referred to as circumferential grooves (at least when installed along a tire carcass), and lateral grooves 22. Prior to arrangement on the tire carcass 14, the longitudinal grooves 20 may extend longitudinally in a lengthwise direction of the tread without extending circumferentially, such as when formed in a flat mold, for example. Lateral top grooves 22 may be provided on the top side of the tread extending in a widthwise or lateral direction of the tread transverse to the longitudinal or circumferential direction of the longitudinal grooves 20.

The arrangement of top grooves 20 and lateral grooves 22 may form tread blocks or elements 24 arranged along the outer or top side 16. A rib 26 generally refers to a ground engaging portion along the circumference of the tread, and may include a single tread block 24 formed between laterally spaced longitudinal grooves 20, shown as solid ribs 26a in FIG. 1, or between a longitudinal groove and a lateral side of the tread (not shown), or an arrangement or array of tread blocks arranged longitudinally or circumferentially along a length of the tread, shown as ribs 26b in FIG. 1.

Also shown in FIGS. 1-2 are bottom longitudinal grooves 32 in fluid communication with the bottom of the tread, the grooves 32 providing one or more submerged wear layers when the tread is operatively attached to the tire carcass 14. The bottom side surface 18 is attached to the tire carcass thereby closing the bottom longitudinal grooves 32 between the tread thickness and the tire carcass. The submerged bottom longitudinal grooves 32 become exposed to a worn top side 16 after sufficient tread material has been worn away from the tread 12. It is understood that top longitudinal grooves 20 and bottom longitudinal grooves 32 may be relationally positioned in any arrangement as desired. For example, with reference to FIGS. 1-2, the bottom longitudinal grooves 32 may be arranged between top grooves or between top grooves and the lateral sides of the tread. Alternatively, the bottom longitudinal grooves 32 may be aligned with the top longitudinal grooves 20, which is exemplarily shown in FIGS. 5-6. It is also understood that top and bottom longitudinal grooves 20, 32 may have a constant depth or a variable depth extending into the thickness of the tread.

Figure 11:
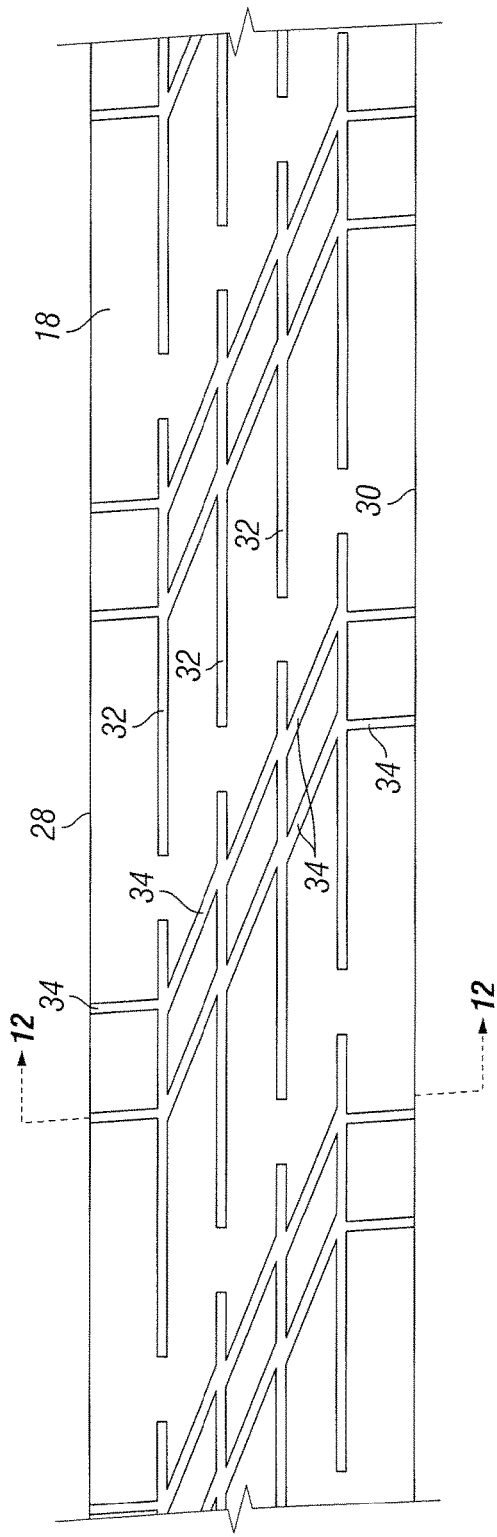
FIG. 11 is a bottom view of a particular embodiment of a tread before application to a tire carcass to form a retreaded tire.
Figure 12:
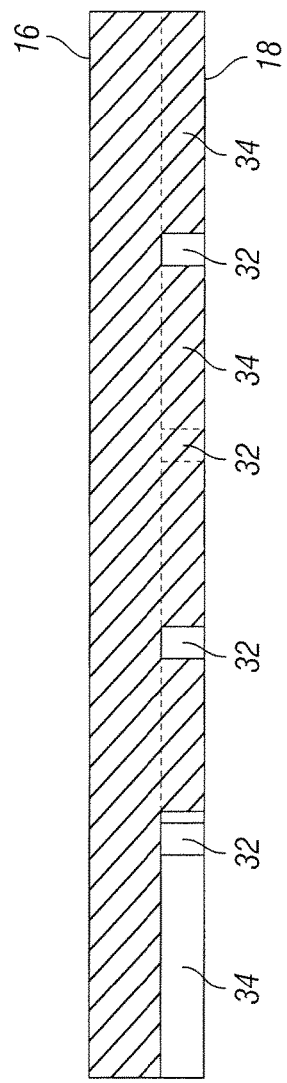
FIG. 12 is a sectional view taken along line 12-12 in FIG. 11.
Figure 13:
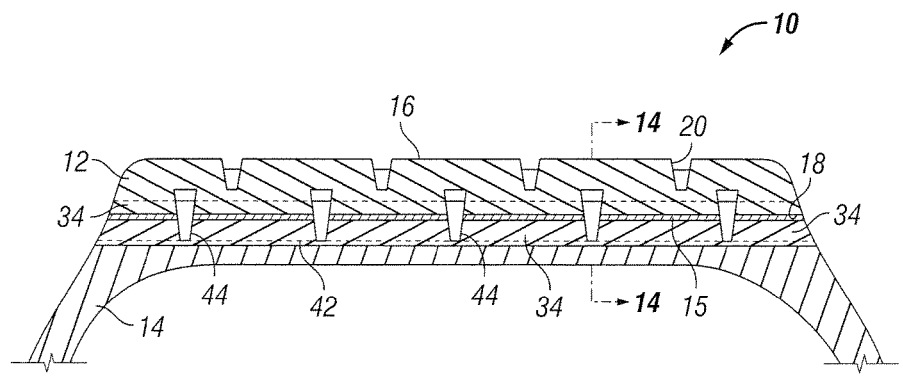
FIG. 13 is a front sectional view of the tire tread of FIG. 2 shown arranged atop a tire carcass according to an alternative embodiment of FIG. 1, where bottom grooves of the tread are aligned with tread grooves arranged within a pre-existing tread layer in the tire carcass.

With continued reference to FIGS. 1-2, treads include one or more recessed lateral grooves 34 extending inwardly from one or more side edges 28, 30 to facilitate venting of air or other gases from voids arranged internally within the tread, that is voids arranged inward from, and not in fluid communication with, side edges 28, 30. In the embodiment shown, recessed lateral grooves 34 are in fluid communication with the bottom side 18 of the tread thickness, and intersect one or more longitudinal grooves 20, 32 to form a vent passageway extending from the one or more longitudinal grooves 20, 32 to the first side edge 28. Particularly, the lateral groove 34 may intersect one or more top longitudinal grooves 20, one or more bottom longitudinal grooves 32, or a combination of top longitudinal grooves 20 and bottom longitudinal grooves 32. For example, in FIGS. 1-2, each recessed lateral groove 34 extends laterally beyond a first bottom groove 32 toward an opposing lateral side 30 of the tread, such as to intersect one or more additional bottom grooves 20 and/or bottom grooves 32 for providing venting capabilities to the additional one or more grooves 20, 32. It is understood, however that the lateral groove can terminate at the initial top groove 20 without extending further. It is also understood that the recessed lateral grooves 34 can extend a full width of the tread between side edges 28, 30, which is exemplarily shown in FIGS. 11-12, where the recessed lateral groove intersects multiple bottom longitudinal grooves 32.

Figure 3:
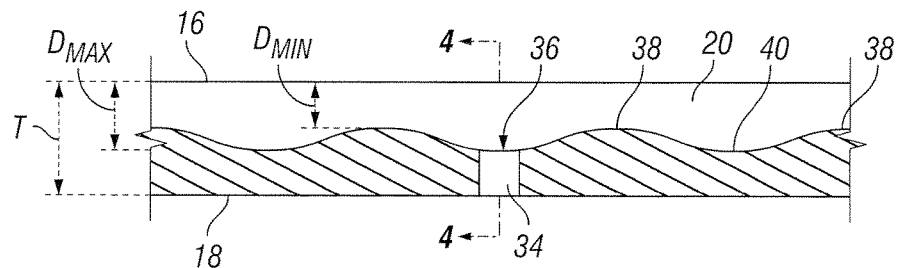
FIG. 3 is a partial cross sectional view taken along line 3-3 in FIG. 2 through a lateral bottom groove.
Figure 4:
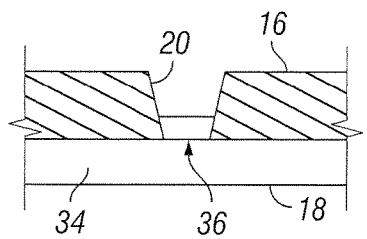
FIG. 4 is a partial cross sectional view taken along line 4-4 in FIG. 3 along the lateral bottom groove.

For example, in an embodiment shown in FIGS. 3 and 4, the lateral groove 34 intersects a top longitudinal groove 20 to form a vent passageway extending from the top longitudinal groove 20 to the first side edge 28. By virtue of the grooves intersecting, an opening 36 is formed between the top groove 20 and the lateral groove 34. In the embodiment shown, the grooves intersect by the lateral groove extending along a bottom side of the top groove. In other embodiments, however, with general reference to FIG. 4A, the lateral groove 34 may intersect a side of the top groove 20 as the top groove extends downwardly into the recessed lateral groove. By further example, with reference to the embodiment in FIGS. 5 and 6, the recessed lateral groove 34 intersects a bottom longitudinal groove 32 to form a vent passageway from the bottom longitudinal groove 32 to first side edge 28. In this embodiment, the top longitudinal groove 20 is arranged overtop the bottom longitudinal groove 32. It is understood, however, that any top longitudinal groove may relationally positioned relative to any bottom groove as desired. For example, with reference to the embodiments of FIGS. 1 and 2, top and bottom longitudinal grooves 20, 32 are arranged laterally between one another.

Figure 5:
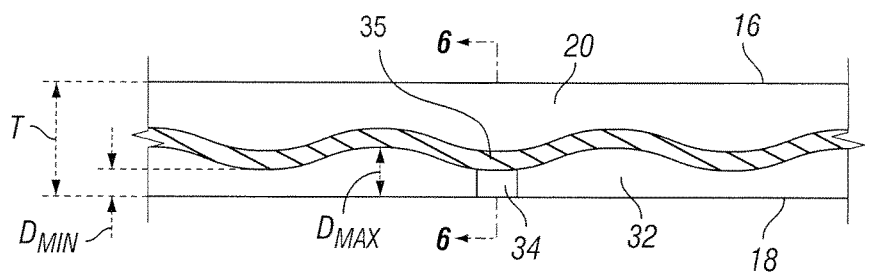
FIG. 5 is an alternative partial cross sectional view of the section of FIG. 3 through an alternative lateral bottom groove.
Figure 6:
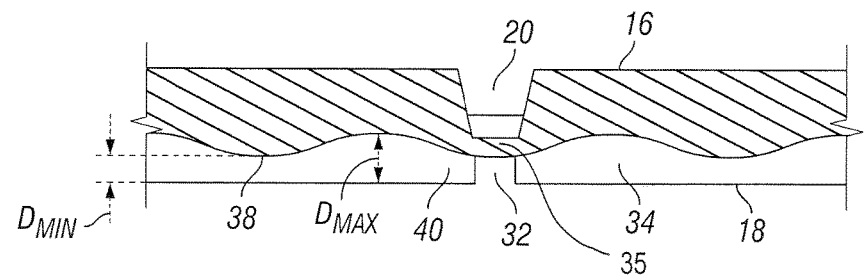
FIG. 6 is a partial cross sectional view taken along line 6-6 in FIG. 5 along the alternative lateral bottom groove.
Figure 7:
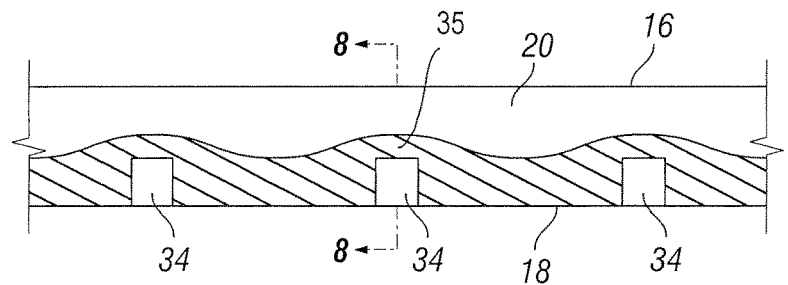
FIG. 7 is another alternative partial cross sectional view of the section of FIG. 3 through another alternative lateral bottom groove.

Also shown in the embodiment of FIGS. 5-6, the bottom lateral groove 34 is arranged to intersect the bottom longitudinal groove 32 such that the lateral groove avoids intersecting the top groove 20. This may be advantageous when trying to prevent any debris from entering the bottom groove from the top groove, such as when the tire will be used for off-road vehicle operation. Of course, the lateral groove 34 of FIGS. 5-6 may be arranged such that it intersects both the top and bottom grooves of the embodiment as generally contemplated above, which may facilitate more direct venting from the bottom longitudinal groove when it is located more centrally between the side edges. In such instances, the venting may more quickly be achieved when traveling outwardly through the top groove as opposed to traveling a longer distance to a side edge. In another embodiment shown in FIG. 7-8, another lateral groove 34 is shown extending below a top groove 20 to avoid intersection therewith. In avoiding such intersection, with reference to FIGS. 5-8A, a thickness of tread 35 separates the grooves, where the thickness of tread 35 may comprise any desired thickness.

It is understood that recessed lateral grooves 34 may extend lengthwise in any desired lateral direction. For example, such grooves may be oriented in a direction substantially perpendicular to the longitudinal grooves 20, 32 or either side edge 28, 30, or may be oriented in a direction transverse to the longitudinal grooves 20, 32 or either side edge 28, 30. For example, with reference to FIGS. 9 and 10, the lateral grooves 34 include portions or segments arranged substantially perpendicular to the longitudinal grooves 20, 32, the segments extending laterally inward from each side edge 28, 30 in the embodiment shown. The lateral grooves 34 shown also include segments or portions arranged transverse to the longitudinal grooves 20, 32, the segments which are arranged more centrally between the side edges 28, 30 in the embodiment shown.

It is also understood that any recessed bottom lateral groove 34 may extend lengthwise in a lateral (i.e., widthwise) direction of the tread along any desired path, where such path may comprise any linear and/or non-linear path. A non-linear path may form a variable depth path, that is, a path that varies depthwise within a thickness of the tread. A non-linear path may also comprise a path that varies in a longitudinal direction of the tread. Exemplary non-linear paths include zig-zagging paths, which are comprised of linear segments, and curvilinear paths. It is understood that a recessed lateral groove 34 may include a combination of one or more portions that extend lengthwise linearly and one or more portions that extend lengthwise non-linearly.

As suggested above, an particular embodiments, any recessed lateral bottom groove may vary in depth as it extends lengthwise, whereby a top of the groove varies in elevation within the thickness of the tread. The variable depth path along which the recessed lateral groove extends may be linear or non-linear. When a non-linear path varies up and down depthwise within the tread thickness, the path is an undulating or alternating path. For example, with reference to FIG. 6, the undulating path extends lengthwise along a path having peaks 38 and valleys 40 of constant or variable height. Generally, variable height, non-linear undulating paths are shown in FIGS. 5, 6, and 8.

It is understood that the variable depth lateral bottom groove may intersect any top or bottom longitudinal groove and/or may extend below the bottom of any top groove as desired for the purpose of not intersecting the top groove. For example, with reference to the embodiment in FIGS. 7-8A, the recessed lateral groove 34 undulates without intersecting a top longitudinal groove 20. With specific reference to FIG. 7, it is shown that the recessed lateral groove 34 is arranged such that the lateral groove undulates below the top groove 20 by a distance, where the top groove also undulates and the lateral groove passes below the top groove at a peak of the undulating top groove, that is, in other words, generally at a location of minimum depth of the top groove. The distance between the top groove and the recessed lateral groove may be any desired distance. This arrangement may be beneficial for maximizing the height or depth of the lateral groove. Accordingly, it is understood that any top or bottom longitudinal groove may form a variable depth groove extending along any linear or non-linear path, which may undulate, as generally discussed in association with the variable depth recessed lateral groove above. Other exemplary embodiments of variable depth top and/or bottom longitudinal grooves are shown in FIGS. 2-6, 13-14. By varying the depth of any groove, multiple wear layers are formed in the tire, whereby different tread and void configurations become exposed as the tread wears deeper through its thickness. This may be helpful to alter any void content and arrangement within the void for use at different stages of the tread life.

Figure 8:
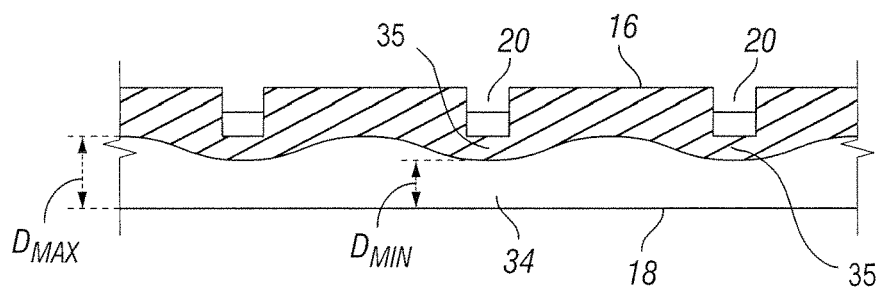
FIG. 8 is a partial cross sectional view taken along line 8-8 in FIG. 7 along the alternative lateral bottom groove.

With reference to FIGS. 6 and 8, for example, variable depth recessed lateral grooves 34 are shown varying in depth between a minimum depth $D_{min}$ and a maximum depth $D_{max}$. The minimum depth $D_{min}$ and the maximum depth $D_{max}$ for any variable depth recessed lateral groove may equal any desired depth of the tread thickness. For example, the minimum depth $D_{min}$ may be as small as zero while the maximum depth $D_{max}$ may be equal to as large as the total tread thickness T. Likewise, with reference to FIGS. 3 and 5 for example, variable depth top and bottom longitudinal grooves 20, 32 also vary in depth between a minimum depth $D_{min}$ and a maximum depth $D_{max}$. The minimum depth $D_{min}$ and the maximum depth $D_{min}$ for any top or bottom variable depth longitudinal groove may also equal to any desired depth. For example, the minimum depth $D_{min}$ may be as small as zero while the maximum depth $D_{max}$ may be equal to or as large as the total tread thickness T. By further example, as each variable depth groove 20, 32, 34 varies between a minimum depth and a maximum depth, in particular embodiments, the difference between each such depth being approximately equal to or greater than 10% of the maximum depth. In other variations, the difference may be approximately equal to or greater than 25%, 50%, or 75% of the maximum depth in other particular embodiments. By further example, the difference between the minimum and maximum depth of any groove 20, 32, 34 may be at least 1 millimeter (mm), 2 mm, or 5 mm in certain instances, for example.

When a top longitudinal groove is offset or separated depthwise from a bottom longitudinal groove or a recessed lateral groove, such as by a thickness of tread 35, regardless of whether any groove is a variable depth groove, a connecting opening may be formed through a thickness of the tread 35 separating the top longitudinal groove and any adjacent bottom longitudinal groove or recessed lateral groove. For example, with reference to FIG. 8A, a connector 36a is shown extending through a thickness of tread 35 arranged between a top longitudinal groove and a recessed lateral groove. By further example, with reference to FIG. 6, a connector 36a may be formed through a thickness of tread 35 between top and bottom longitudinal grooves 20 and 32, such as when a top longitudinal groove is arranged overtop a bottom longitudinal groove, such as is shown in FIGS. 5-6. In any such instance, the connector may also be arranged to connect top longitudinal groove with recessed lateral groove 34 if the connector is arranged at a location where the recessed lateral groove intersects the bottom longitudinal groove. In any event, connectors 36a may be formed during the molding process, or subsequent the molding process by employing any known material removal process, which includes forming the connector using cutting, abrading, punching, or drilling tool or operation.

Recessed lateral grooves may comprise any desired shaped or arranged groove. For example, a recessed lateral groove may comprise a groove portion that is recessed from both the top and bottom sides while the groove remains in fluid communication with the bottom side by arranging a connecting portion extending from and between the recessed groove portion and the bottom side. For example, with reference to FIGS. 9-10, the recessed lateral groove 34 comprises a recessed groove portion 34a recessed from both the top and bottom sides 16, 18, where a connecting portion 34b extends between the bottom side and the recessed groove portion such that the recessed groove portion and the recessed lateral groove is in fluid communication with the bottom side 18. The submerged lateral groove 34 is shown to intersect a longitudinal bottom groove 32 to form a vent passageway from the submerged longitudinal bottom groove 34 to any side edge 28, 30. In the embodiment shown, the connecting portion 34b comprises a sipe extending along a non-linear path laterally across a width of the tread in FIG. 9 and along a non-linear path depthwise within a thickness of the tread in FIG. 10. It is understood, however, that either or both paths may comprise a linear path in other variations. Further, in lieu of using a sipe for connecting portion 34b, a narrow groove narrower in width than the groove portion 34a may be employed.

Figure 9:
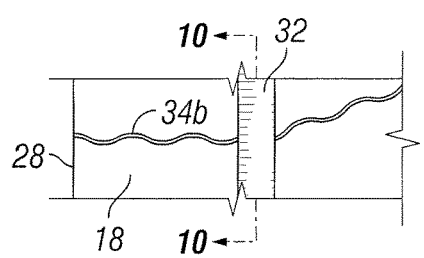
FIG. 9 is a partial bottom view of a tread bottom showing a sipe forming a connecting portion of a recessed lateral groove, the sipe extending into a bottom longitudinal groove according to an embodiment of the invention.
Figure 10:
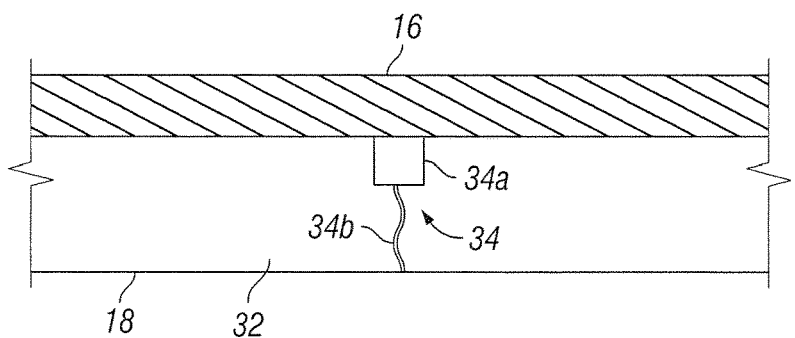
FIG. 10 is the partial cross sectional view of FIG. 8 with an opening added between a top longitudinal groove and a bottom lateral groove.

As with any recessed lateral groove discussed in association with FIGS. 9-10, it is understood that any top or bottom longitudinal groove may comprise a recessed groove portion recessed within a thickness of the tread such that the groove portion is offset or recessed from the top side, the top or bottom longitudinal groove further comprising a connecting portion to arrange the corresponding top or bottom longitudinal groove in fluid communication with respective top or bottom. It is understood, however, in other embodiments that any recessed lateral groove, top longitudinal groove, and/or bottom longitudinal groove may comprise the recessed groove portion without any connecting portion extending between each such groove portion and the respective top or bottom side of the tread. In such instances, any such groove is not maintained in fluid communication with respective top and bottom sides whereby any such groove is fully recessed within a thickness of the tread.

Figure 14:
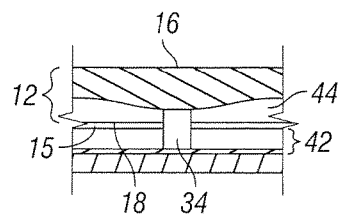
FIG. 14 is a sectional view taken along line 14-14 in FIG. 13 showing a recessed lateral groove arranged within the tread and overtop a lateral groove arranged within the pre-existing tread layer of the tire carcass.

By employing the inventive features described herein, treads may be formed thinner than prior treads while maintaining tread rigidity, better controlling void arrangement, and addressing any noise issues, etc. Thinner treads may be useful when retreading tire carcasses whereby a portion of the old tread is preserved on the tire carcass. Because a portion of the old tread remains, thinner treads maybe used to reduces waste when retreading. Not only is less of the old tread removed, but also less material is used to form the new tread. In such instances when a portion of the old tread remains, the grooves in the old tread may also remain. Accordingly, a new tread having bottom grooves may be employed, the bottom grooves being aligned with the existing tread grooves in the tire carcass. For example, with reference to FIG. 13, a thinner tread 12 employing both top and bottom grooves 20, 32 is arranged atop a tire carcass 14 having a worn tread layer 42, the worn tread layer forming a pre-existing tread layer having grooves 44 arranged therein. Grooves 44 may comprise the pre-existing worn grooves of the tread or may have been added by any abrading or cutting operation during the present retreading operation to adapt the pre-existing tread layer to a new tread layer design. Specifically, in FIG. 13, the tread of FIG. 2 is arranged along the tire carcass 14, the bottom grooves 32 being laterally aligned over top the worn grooves 44. It is understood, however, that any tread discussed or contemplated herein may be arranged atop a tire carcass 14, whether or not such carcass includes grooves 44. But by employing the treads having top and bottom grooves 20, 32, any old groove 44 may remain useful in the retreaded tire. With reference to FIG. 14, it is also understood that recessed lateral groove 34 may be longitudinally aligned overtop a lateral groove 46 arranged within the pre-existing tread layer 12. The lateral groove 46 may be a pre-existing groove that may or may not be enlarged as necessary to facilitate application of the new tread layer 12. The lateral groove 46 may also be added as necessary to achieve a desired final retreaded tire tread.

The vent passageways in the present tire tread provide unique advantages over prior retread tire treads. Not only does the invention facilitate venting during tire curing operations to inhibit entrapment of air below the tread outer surface, particular embodiments of the invention tread promote cooler operating tires. For example, certain embodiments having recessed lateral vents, wherein top longitudinal grooves in fluid communication with lateral grooves open to the side of the tread, have shown a decrease in tire operating temperature ranging from 5° C. to 25° C., which resulted in a 4% to 18% reduction in tire operating temperature. This decrease in temperature was observed when testing tires having a plurality of the venting passageways arranged along the tire tread. The venting passageways comprised recessed lateral grooves extending from a side of the tread to intersect the first top longitudinal groove from the tread side. Testing comprised running 445/50 R22.5 tires pressurized to 9.3 bar on a road wheel at a speed of 90 kilometers per hour (kph) while exposed to a vertical load of 4,625 kilograms (kg) at zero camber.

The present tire tread may be formed in a tire tread mold having inventive features enabling the formation of vent passageways from longitudinal grooves to lateral grooves in fluid communication with the bottom side of the tread thickness. Referring now to FIG. 15, a mold 48 for forming a tire tread includes a first mold portion 50 and a second mold portion 52 cooperatively positionable together to form a cavity 54 there between, the cavity forming a void for receiving tread material to form a corresponding tire tread of a desired shape and size. The mold may form a "flat" mold generally comprising a thickness extending lengthwise (that is, longitudinally) and widthwise (that is, laterally) linearly or within a plane. In other words, the cavity of the flat mold has a thickness extending longitudinally and laterally in a linear or planar direction. In other variations, the mold thickness or the mold cavity extends longitudinally in a non-linear path, which includes an arcuate path. Any such mold generally includes a first mold portion and a second mold portion arranged to engage each other to form a cavity for forming the tread. Each of the first and second mold portions may be continuous or may be formed of a plurality of segments independently moveable or operably joined to integrally form each of the first and second mold portions. The first and second mold portions may be segmented (that is, divided) lengthwise and/or laterally, such that each of the first and second mold portions comprise a plurality of segments arranged in a lengthwise and/or a widthwise direction of each first and second mold portion, respectively. In particular embodiments, first and second mold portions form mold halves, where each halve does not necessarily comprise a 50% portion of the mold or form 50% of the mold cavity but rather forms first and second mold portions that together form a mold cavity when the mold is in a closed arrangement. Additional mold portions may also be used in addition to the first and second mold portions to form the cavity. For example, additional mold portions may be used to form one or both sides of a tread molding cavity, whereby, for example, each side is arranged between a first and second mold portions to form the lateral sides of the tread.

In the embodiment shown in FIG. 15, the first mold portion 50 forms a top mold portion having a top interior surface 56 corresponding to the top side of a tread thickness configured to engage a ground surface during tire operation (for example, the top side 16 as shown in FIG. 2), and the second mold portion 52 forms a bottom mold portion having a bottom interior surface 58 corresponding to a bottom side of the tread thickness configured to attach to a tire carcass (for example, the bottom side 18 as shown in FIG. 2). In particular embodiments, with reference to FIGS. 15 and 16, the top interior surface 56 is narrower in width than the bottom interior surface 58 to form a tread having a top side of the tread 16 that is narrower in width than the bottom side of the tread 18, which is shown by example in FIG. 2. Mold 48 also includes a first interior side surface 60 and a second interior side surface 62 corresponding to a first side edge of the tread thickness and a second side edge of the tread thickness respectively, each extending longitudinally in a lengthwise direction of the tread. The first interior side surface 60 is arranged laterally opposite the second interior side surface 62 along a width of the mold. More generally, first and second interior side surfaces 60, 62 are referred to as interior side surfaces or side surfaces.

The mold 48 includes a longitudinal groove core 64 projecting into the cavity 54, positioned corresponding to a longitudinal top groove or longitudinal bottom groove in the tread thickness. With reference to the embodiment of FIG. 15, the longitudinal groove core 64 is a top longitudinal groove core 64a extending into cavity 54 from the top interior surface 56 and which corresponds to a longitudinal top groove in the tread thickness (for example, the top longitudinal groove 20 as shown in FIG. 2). With continued reference to FIG. 15, additional longitudinal groove cores 64 are present to form a bottom longitudinal groove core 64b extending into cavity 54 from the bottom interior surface 58 and which corresponds to a longitudinal bottom groove in the tread thickness (for example, the bottom longitudinal groove 32 as shown in FIG. 2). A recessed lateral groove core 66 is also provided, which is connected to the bottom interior surface 58, the lateral groove core 66 projecting into the cavity 54 the bottom interior surface 58 and being submerged depthwise within a thickness of cavity 54 and a distance below the top interior surface 56 of the top mold portion 50. The recessed lateral groove core 66 corresponds to a recessed lateral groove formed in the tread, the recessed lateral groove in fluid communication with the bottom side of the tread thickness and recessed below the top side of the tread thickness to thereby form a vent passageway within the tread thickness from the longitudinal groove in the tread thickness through the first side edge of the tread thickness. For example, the recessed lateral groove 34 as shown in FIG. 2.

In the embodiment of FIG. 15, the longitudinal groove core 64a is operably connected to the top interior surface 56 corresponding to a top longitudinal groove in the tread in fluid communication with the top side of the tread thickness, and the bottom longitudinal groove core 64b is operably connected to the bottom interior surface 58 corresponding to a bottom longitudinal groove in fluid communication with the bottom side of the tread thickness. In this embodiment, the lateral groove core 66 intersects the bottom longitudinal groove core 64b and is in contacting engagement with the top longitudinal core 64a when the mold is in a closed arrangement, such as is shown by example in FIG. 15 where the first mold portion 50 and the second mold portion 52 are positioned together. It is understood that lateral groove core 66 may be operably attached to the bottom longitudinal groove core 64b at the intersection thereof, or, in other variations, may operably engage the bottom longitudinal groove core directly or may operably engage a member arranged there between, such as a compressible member. It is understood that lateral groove core 66 may be elevated from the bottom interior surface 58 when the recessed lateral groove formed in the tread is intended to include a recessed lateral groove portion in fluid communication with the bottom side of the tread, such as is exemplarily shown in FIGS. 9-10 whereby a connecting portion 34b extends between the recessed lateral groove portion 34a and the bottom side of the tread. In such situations, which are not shown, a connecting portion core for forming a connecting portion is arranged between the bottom interior surface 58 and the recessed lateral groove core 66. In particular embodiments, the connecting portion core forms a core shaped to form a similarly sized and shaped connecting portion, which may form a narrow groove or sipe, where the connecting portion core is a narrow groove core or a sipe core. With reference to FIGS. 9 and 10, a connecting portion core may be similarly sized and shaped to connecting portion 34b, which forms a sipe.

In the mold shown in FIG. 15, the recessed lateral groove core 66 generally extends toward each side 60, 62 of the top mold portion. While it is understood that the recessed lateral groove core 66 could be arranged to abut either side 60, 62 as the top and bottom mold portions 50, 52 close to form a recessed lateral groove that is open to a side edge of a tire tread, the embodiment shown includes a compressible pad 68 arranged between each mold side 60, 62 and the terminal end of the recessed lateral groove core 66. This pad 68 can be described as forming an extension of the recessed lateral groove core 66, such that the corresponding side 60, 62 of the top mold portion 50 contacts the pad in lieu of contacting the recessed lateral groove core or in lieu of providing a space or gap between the lateral groove core and the side. Employing the compressible pad is helpful to prevent the recessed lateral grove core and any top mold portion side 60, 62 from contacting during mold closure when each are formed of a rigid material, such as any metal, since any contact therebetween could cause damage to the mold. Further, the compressible pad 68 is able to account for any misalignment of the top and bottom mold portions that may arise as the mold closes and otherwise form an unintended gap between surfaces that were otherwise intended to contact upon mold closure. Misalignment may arise due to wear of the mold from continued use.

In particular embodiments, the compressible pads 68 has a thickness that is oversized for the gap each is designed to fill between the mold side 60, 62 and a recessed lateral groove core 66, to ensure contact of the pad by each of the side and the core. Because, in the embodiment shown, the pad 68 forms an extension of the recessed lateral groove core 66, the pad has a cross-sectional shape equal to the cross-sectional shape of the recessed lateral groove core taken perpendicular to the longitudinal lengthwise extension of the core. It is understood, however, that the cross-sectional shape of the compressible pad may comprise any desired shape, including a shape that is approximately equal to the shape of any adjacent structure within the mold. For example, the compressible pad 68 may be approximately equal to the tip of the top longitudinal groove core shown in FIGS. 15 and 16. While forming an end of the core 66, it is understood that pad 68 may be attached to either the mold side 60, 62 or the end of core 66. It is also understood, however, that the pad 68 may be arranged within a recess in the mold side 60, 62 adjacent a terminal end of the core 66.

Figure 4A:
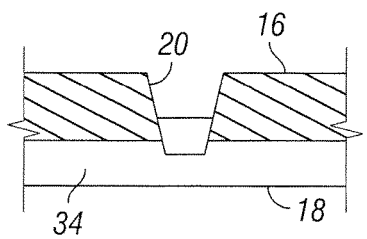
FIG. 4A is a partial cross sectional view of an alternative embodiment to the tread of FIG. 4, whereby the top longitudinal groove extends downward into the recessed lateral groove.

It is understood that compressible pads 68 may be used at any location between the top and bottom mold portions 50, 52 or any components of such mold portions that may otherwise contact upon mold closure to together create a void in a tire tread. For example, compressible pads may be used to fill the gap between any top longitudinal groove core 64a and any recessed lateral groove core 66 when it is desired that a recessed lateral groove intersect a top longitudinal groove in the tire tread without the respective top and bottom mold portions contacting or otherwise leaving a space between the respective top and bottom mold portions. The embodiment of FIG. 15 represents a mold capable of forming a tread having recessed lateral grooves 34 that intersect a top longitudinal groove 20 as shown in FIGS. 1-2. In other embodiments, a compressible pad 68 may be arranged between the top longitudinal groove core 64a and the recessed lateral groove core 66 to form a tread having recessed lateral grooves 34 that intersect a top longitudinal groove 20 as shown in FIG. 4A, where the pad would extend around the bottom terminal end of the top longitudinal groove core between each intersecting core and the first and second mold portions 50, 52.

Compressible pad is formed of any material suitable for its intended purpose, that is a material that is not only compressible but also able to withstand the elevated temperatures and pressures that it would be exposed to during the molding and curing process. For example, such a material may comprise silicon or Teflon™.

In lieu of having the recessed lateral groove core 66 extend into a side surface 60, 62 of a top mold portion 50, such as shown in FIG. 15, the recessed lateral groove core 66 may be arranged such that the terminal end of the recessed lateral groove core 66 engages a side surface 59 of the bottom mold portion 52. For example, with reference to the embodiment shown in FIGS. 16 and 17, the mold parting line 70 is arranged at a location at or above the top of the lateral groove core 66 where the lateral groove core 66 fully intersects an interior side surface 59 of the bottom mold portion, the parting line forming the partition between the top mold portion 50 and the bottom mold portion 52 where engagement surfaces 72, 74 of the top and bottom mold portions 50, 52 meet, the engagement surfaces 72, 74 being located where the side surfaces 60, 62 of the top mold portion and the side surfaces 59 of the bottom mold portion terminate, respectively. In such instances, the recessed lateral mold core 66 extends into an interior side surface 59 of the bottom mold portion 52 whereby a height of the lateral groove core 66 fully engages the bottom mold portion side surface 59. In this way, the lateral groove core can be constructed so that no tread material can flow between the lateral groove core and the intersecting side surface causing unwanted flash. This avoids the need to arrange a compressible pad 68 at the terminal end of the recessed lateral groove core as is done in the FIG. 15, where the mold parting line 70 is below the terminal end of the recessed lateral groove core 66, the parting line being arranged along a bottom surface 58 of the bottom mold portion 52. It is understood that at other lateral locations within the bottom mold portion (that is, at lateral locations between the mold side surfaces 59), the lateral groove core 66 may extend above, or remain level with or below, the parting line 70 (that is, the top side of the bottom mold portion).

In other embodiments, to avoid contact between any lateral groove cores and the top mold portion, lateral groove cores may be spaced from any adjacent feature of the top mold. In doing so, a molded tread portion may be formed within the space which may be minimal, such as when forming flash that may be subsequently removed from the tread after molding, or which may be more substantial, such as is shown by example in FIGS. 7-8A whereby a thickness of the tread separates the top longitudinal groove and a recessed lateral groove. For example, with reference now to the embodiments in FIGS. 18-20, a lateral groove core 66 is shown to extend beyond the side surface of the top mold portion and into the side 60, 62 of the top mold portion 50. In FIG. 19, an aperture 76 is arranged in the side of the top mold portion for receiving the lateral groove core. In such embodiment, a space 76$_A$ is arranged between the respective adjacent features of the top and bottom mold to avoid contact there between. Tread material may ultimately migrate into the space during the molding process to form unwanted flash, which is an undesired extension of the tread that may be removed after molding if desired. In other variations, it is understood that the space 76$_A$ may be enlarged to receive a compressible insert for arrangement between the adjacent features of the top and bottom mold portions. Likewise, lateral groove core 66 may extend into a longitudinal groove core 64, 64a arranged along the top mold portion 50. With reference to FIG. 20, for example, a lateral groove core 66 may extend through an aperture 78 formed in a top longitudinal groove core 64a. As discussed above in association with FIG. 19, the lateral groove core and the top longitudinal groove core maybe spaced apart from one another when the mold is in a closed arrangement to form space 78$_A$. This spaced may remain, whereby tread may migrate into such space during the molding process as shown in FIG. 20, or may be sized to receive a compressible insert to consume at least a portion of the space. It is noted that a compressible insert may extend laterally in a non-linear path, such as to consume much of any space.

A method of forming a tire tread may include providing a tire tread mold, where the mold includes a first mold portion and a second mold portion cooperatively positionable together to form a cavity there between corresponding to a tire tread, the first mold portion including a top interior surface corresponding to a top side of a tread thickness configured to engage a ground surface during tire operation, the second mold portion including a bottom interior surface corresponding to a bottom side of the tread thickness configured to attach to a tire carcass. The tread mold typically includes a first interior side surface corresponding to a first side edge of the tread thickness and a second interior side surface corresponding to a second side edge of the tread thickness respectively, each extending longitudinally in a lengthwise direction of the tread.

In particular embodiments of the present method include arranging a longitudinal groove core within the mold to project into the cavity, the longitudinal groove core being positioned to form a corresponding longitudinal top groove or longitudinal bottom groove in the tread thickness. The method further includes arranging a recessed lateral groove core in operable connection with the bottom interior surface of the second mold portion, the lateral groove core being arranged to extend from the first interior side surface and engage the longitudinal groove core at least when the first mold portion and the second mold portion are positioned together, the recessed lateral groove core being arranged a distance below the top interior surface of the first mold portion.

A further step may include molding tread material in the mold cavity to form the tread, the tread including a lateral groove in the tread formed by the lateral groove core, the lateral groove in fluid communication with the bottom side of the tread thickness to form a vent passageway in the tread thickness from the longitudinal groove to the first side edge of the tread thickness.

In one alternative of the present method, the longitudinal groove core is connected to the bottom interior surface corresponding to a longitudinal bottom groove in the tread thickness, where the longitudinal groove core forms a longitudinal bottom groove in the tread in the step of molding, the longitudinal groove being in fluid communication with the bottom side of the tread thickness.

Alternatively, the longitudinal groove core is connected to the top interior surface corresponding to a longitudinal top groove in the tread thickness, where the longitudinal groove core forms a longitudinal top groove in the tread in the step of molding, the longitudinal groove being in fluid communication with the top side of the tread thickness.

In particular embodiments of the present method, the first mold portion having first engaging surfaces and the second mold portion having second engaging surfaces oppositely positioned when the first mold portion and the second mold portion are positioned together such that a compressible pad is positioned between the first and second engaging surfaces to form a gap between the lateral groove core and the top longitudinal groove core. Then, the method may include pressing the first and second mold portions together compressing the compressible material forming contacting engagement between the lateral groove core and the top longitudinal groove core.

Figure 8A:
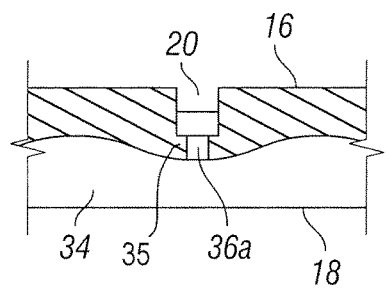
FIG. 8A is the partial cross sectional view of FIG. 8 with an opening added between a top longitudinal groove and a bottom lateral groove.

In particular alternatives, after the step of molding the tread, a thickness of tread separates the top groove from the lateral groove at the intersection of the top groove and the lateral groove such as shown in FIGS. 5-8A. When the thickness of tread is present between the top groove and lateral groove, prior to the step of arranging the tire tread overtop the tire carcass the method may include forming an opening in the thickness of tread separating the top groove from the lateral groove forming the vent passageway from the top groove through the first side edge such as shown in FIG. 8A by example. The thickness of tread separating the top longitudinal groove and the lateral groove may be a thin layer of flash or a thicker piece of tread as generally discussed above.

The present method may provide a plurality of lateral groove cores connected to the bottom interior surface projecting into the cavity extending from the first interior side surface in contacting engagement with the longitudinal groove core when the first mold portion and the second mold portion are positioned together, forming a plurality of lateral grooves in the tread by the lateral groove cores, the plurality of lateral grooves in fluid communication with the bottom side of the tread thickness forming a plurality of vent passageways in the tread thickness from the longitudinal groove through the first side edge of the tread thickness.

Prior to use on a tire, any tread discussed above and contemplated herein is arranged annularly about or overtop to tire carcass and bonded thereto to form a retreaded tire. Accordingly, the invention includes methods of forming a retreaded tire. Such methods include the step of providing any tire tread discussed or contemplated above. In particular embodiments, the tread provided has a thickness bounded depthwise by a top side configured to engage a ground surface during tire operation and a bottom side configured to attach to a tire carcass, the thickness extending laterally between a first side edge and a second side edge and longitudinally in a lengthwise direction of the tread, a longitudinal groove in fluid communication with the top side or the bottom side of the tread thickness, and a lateral groove in fluid communication with the bottom side of the tread thickness extending from the first side edge intersecting the longitudinal groove forming a vent passageway from the longitudinal groove through the first side edge.

Such methods may further include the step of providing a tire carcass, the tire carcass including a pre-existing tread layer. The pre-existing tread layer may include grooves arranged therein, such as, for example, longitudinal grooves extending into a thickness of the pre-existing tread layer from a top side of the pre-existing tread layer. The pre-existing tread layer may be of constant thickness or of variable thickness, such as when the layer has been exposed to uneven wear. Any grooves arranged within the pre-existing tread layer may be formed therein originally or may be subsequently formed therein by any abrading or cutting operation prior to arranging the new tread layer overtop the tire carcass. Also prior to applying the new tread layer, the pre-existing tread layer may be prepared, such as by cleaning the pre-existing tread layer and/or removing material from the pre-existing tread layer by any known means of removing tread material from the pre-existing tread layer. Such means may comprise use of any abrading, buffing, or grinding operation.

Particular embodiments of such methods may further include the step of applying a bonding layer atop the pre-existing tread layer prior to applying the new tread layer. The bonding layer is formed of any elastomeric or polymeric material that is curable. The bonding layer may be applied by any known means, such as by extrusion. The step of molding may include fully or partially curing the tread material to form a final cured tread.

Such methods may further include the step of arranging the tire tread overtop the tire carcass such that the top or bottom groove arranged within the tire tread is arranged over top a groove arranged in a pre-existing tread layer of the tire carcass. This is shown by example in FIGS. 13 and 14. It is understood, however, that in other embodiments, the top or bottom groove is not arranged overtop the groove of the pre-existing tread layer.

Such methods may further include the step of bonding or attaching the tire tread to the tire carcass to form a retreaded tire. This step may be accomplished by any known means for curing the tread to the tire carcass. For example, the assembled retread tire (i.e., a tire carcass having a tread applied thereto) may be at least partially arranged within a curing membrane and inserted into an autoclave to apply heat and pressure to the assembled retreaded tire.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A tire tread for a retread tire comprising:
a plurality of tread wear layers forming a retread having a retread thickness bounded depthwise by a top side configured to engage a ground surface during tire operation and a bottom side configured to attach to a tire carcass, the retread thickness extending laterally between opposing side edges to define a width of the retread and longitudinally in a lengthwise direction of the retread to define a length of the retread, where the opposing side edges form a first side edge and a second side edge and where the width of the retread along the top side is less than the width of the retread along the bottom side,
a bottom longitudinal groove arranged within one tread wear layer of the plurality of tread wear layers and in fluid communication with the bottom side of the retread thickness, and
a lateral groove in fluid communication with the bottom side of the retread thickness extending from at least one of the side edges and intersecting the bottom longitudinal groove and forming a vent passageway extending from the bottom longitudinal groove to the at least one of the side edges without the lateral groove intersecting a top longitudinal groove and without the lateral groove being in fluid communication with the top side of the retread thickness, such that the top longitudinal groove is offset from the lateral groove within the retread thickness without any opening connecting the top longitudinal groove to the lateral groove and where a connecting portion extends into the retread thickness from the bottom side and between the bottom side and the lateral groove, the connecting portion having a width less than a width of the lateral groove.

2. The tire tread of claim 1, where the bottom longitudinal groove is a first bottom longitudinal groove, the tread further comprising one or more additional bottom longitudinal grooves in fluid communication with the bottom side of the retread thickness, the lateral groove intersecting the first bottom longitudinal groove and the one or more additional bottom longitudinal grooves to form a vent passageway extending from the each of the first bottom longitudinal groove, the one or more additional bottom longitudinal grooves, and at least one of the side edges.

3. The tire tread of claim 1, where the lateral groove undulates within the retread thickness along a length of the lateral groove.

4. The tire tread of claim 1, further comprising a plurality of lateral grooves in fluid communication with the bottom side of the retread thickness extending from the first side edge and intersecting the bottom longitudinal groove forming a plurality of vent passageways extending from the bottom longitudinal groove and to the first side edge.

5. The tire tread of claim 1, where the plurality of tread wear layers forms a new precured tread with the bottom side bonded to a used tire carcass, the lateral groove forming with the tire carcass a vent passageway from the bottom longitudinal groove to the atmosphere through the first side edge.

6. A method of forming a tire tread for a retread tire comprising:
providing a mold comprising:
a first mold portion and a second mold portion cooperatively positionable together to form a cavity there between for molding a retread having a retread thickness formed of a plurality of tread wear layers,
the first mold portion including a top interior surface for forming a top side of the retread thickness configured to engage a ground surface during tire operation,
the second mold portion including a bottom interior surface for forming a bottom side of the retread thickness configured to attach to a tire carcass,
the mold including a first interior side surface for forming a first side edge of the retread thickness and a second interior side surface for forming a second side edge of the retread thickness respectively, each extending longitudinally in a lengthwise direction of the retread, and where a width along the top interior surface between the first side edge and the second side edge is less than a width along the bottom interior surface between the first side edge and the second side edge;
arranging a bottom longitudinal groove core within the mold to project into the cavity, the bottom longitudinal groove core being positioned to form a corresponding bottom longitudinal groove arranged within one tread wear layer of a plurality of tread wear layers and in fluid communication with the bottom side of the retread thickness;
arranging a recessed lateral groove core in operable connection with the bottom interior surface of the second mold portion, the lateral groove core being arranged to extend from the first interior side surface and engage the bottom longitudinal groove core at least when the first mold portion and the second mold portion are positioned together, the recessed lateral groove core being arranged a distance below the top interior surface of the first mold portion; and,
molding tread material in the retread having the retread thickness, the retread thickness including a lateral groove in the retread formed by the lateral groove core, the lateral groove in fluid communication with the bottom side of the retread thickness to form a vent passageway in the retread thickness from the bottom longitudinal groove to the first side edge of the retread thickness without the lateral groove intersecting a top longitudinal groove and without the lateral groove being in fluid communication with the top side of the retread thickness, such that the top longitudinal groove is offset from the lateral groove within the retread thickness without any opening connecting the top longitudinal groove to the lateral groove and wherein a connecting portion core extends between the lateral groove core and the bottom interior surface of the second mold portion, the connecting portion core having a width less than a width of the lateral groove core.

7. The method of forming a tire tread of claim 6, where the first mold portion having first engaging surfaces and the second mold portion having second engaging surfaces oppositely positioned when the first mold portion and the second mold portion are positioned together such that a compressible material is positioned between the first and second engaging surfaces to form a gap between the lateral groove core and the bottom longitudinal groove core, the method further comprising the step of: pressing the first and second mold portions together compressing the compressible material forming contacting engagement between the lateral groove core and the bottom longitudinal groove core.

8. A mold for forming a tire tread for a retread tire comprising:
a first mold portion and a second mold portion cooperatively positionable together to form a cavity there between for molding a plurality of tread wear layers forming a retread thickness of a retread,
the first mold portion including a top interior surface for forming a top side of the retread thickness configured to engage a ground surface during tire operation,
the second mold portion including a bottom interior surface for forming a bottom side of the retread thickness configured to attach to a tire carcass,
the mold including a first interior side surface and a second interior side surface for forming a first side edge of the retread thickness and a second side edge of the retread thickness respectively, each extending longitudinally in a lengthwise direction of the retread, and where a width of the retread along the top side between the first side edge and the second side edge is less than a width of the retread along the bottom side between the first side edge and the second side edge, the mold including a top longitudinal groove core for forming a top longitudinal groove,
the mold including a bottom longitudinal groove core projecting into the cavity positioned for forming a bottom longitudinal groove arranged within one tread wear layer of a plurality of tread wear layers and in fluid communication with the bottom side of the retread thickness, a lateral groove core in operable connection with the bottom interior surface projecting into the cavity extending from the first interior side surface in contacting engagement with the bottom longitudinal groove core when the first mold portion and the second mold portion are positioned together, the lateral groove core for forming a lateral groove in fluid communication with the bottom side of the retread thickness forming a vent passageway in the retread thickness from the bottom longitudinal groove in the retread thickness through the first side edge of the retread thickness without the lateral groove intersecting a top longitudinal groove and without the lateral groove being in fluid communication with the top side of the retread thickness, such that the top longitudinal groove is offset from the lateral groove within the retread thickness without any opening connecting the top longitudinal groove to the lateral groove and wherein a connecting portion core extends between the lateral groove core and the bottom interior surface of the second mold portion, the connecting portion core having a width less than a width of the lateral groove core.

9. The mold of claim 8, further comprising: the first mold portion having first engaging surfaces and the second mold portion having second engaging surfaces oppositely positioned when the first mold portion and the second mold portion are positioned together, a compressible material positioned between the first and second engaging surfaces forming a gap between the lateral groove core and the bottom longitudinal groove core, the gap closable to form contacting engagement between the lateral groove core and the bottom longitudinal groove core by compression of the compressible material.

10. The mold of claim 9, where at least a portion of the first interior side surface and the second interior side surface are in the first mold portion, and the compressible material is positioned between engaging surfaces on an end of the lateral groove core and the first interior side surface.

11. The mold of claim 8, where at least a portion of the first interior side surface and the second interior side surface are in the second mold portion extending a distance toward the top interior surface substantially the same as or greater than the distance the lateral groove core projects into the cavity, and an end of the lateral groove core intersecting the first interior side surface in the second mold portion.

* * * * *

UNITED STATES PATENT AND TRADEMARK OFFICE
CERTIFICATE OF CORRECTION

PATENT NO. : 10,150,269 B2
APPLICATION NO. : 14/367011
DATED : December 11, 2018
INVENTOR(S) : E. Bruce Colby et al.

It is certified that error appears in the above-identified patent and that said Letters Patent is hereby corrected as shown below:

In the Claims

In Column 18; Line 13 (Claim 6), after the phrase "molding tread material in the" insert the phrase --mold cavity to form--

Signed and Sealed this
Twelfth Day of February, 2019

Andrei Iancu
*Director of the United States Patent and Trademark Office*